No. 667,257. Patented Feb. 5, 1901.
W. SHAKESPEARE, Jr. & W. LOCHER.
MECHANICAL FISHING BAIT.
(Application filed July 5, 1900.)
(No Model.)
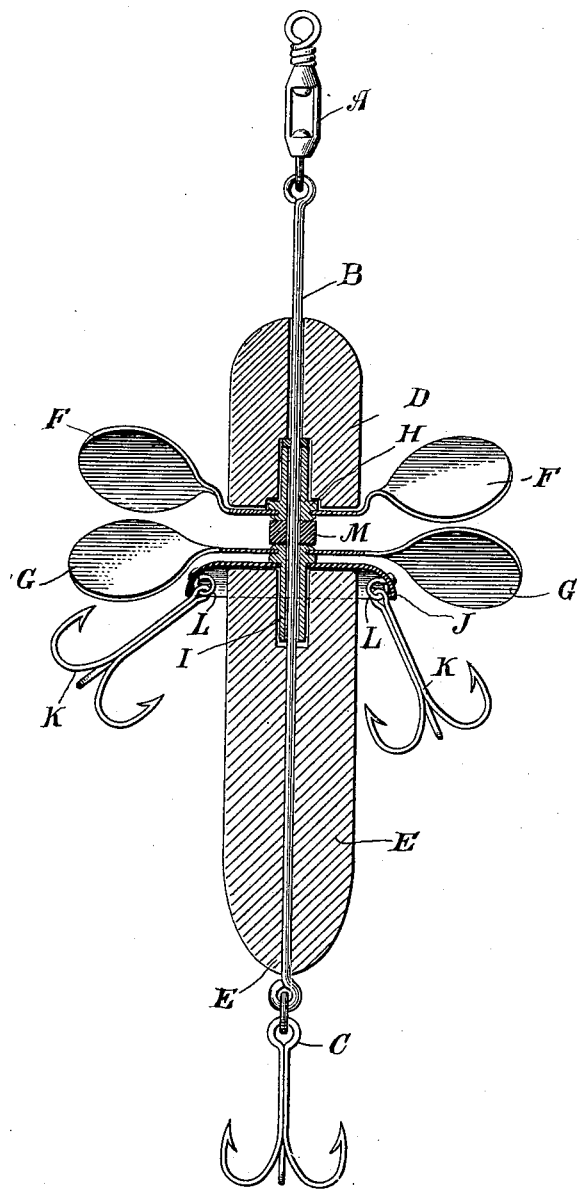
Witnesses:
Geo. W. Naylas
William H. Snelling
William Shakespeare Jr
and
William Locher.
Inventors.
By their Attorney Phillips Abbott.

UNITED STATES PATENT OFFICE.

WILLIAM SHAKESPEARE, JR., AND WILLIAM LOCHER, OF KALAMAZOO, MICHIGAN.

MECHANICAL FISHING-BAIT.

SPECIFICATION forming part of Letters Patent No. 667,257, dated February 5, 1901.

Application filed July 5, 1900. Serial No. 22,531. (No model.)

*To all whom it may concern:*

Be it known that we, WILLIAM SHAKESPEARE, Jr., and WILLIAM LOCHER, citizens of the United States, and residents of Kalamazoo, in the county of Kalamazoo and State of Michigan, (having our post-office address "Care of Kalamazoo Shutter Co., Kalamazoo, Mich.,") have invented a new and useful Improvement in Mechanical Fishing-Bait, of which the following is a specification, reference being had to the accompanying drawing, in which the device, somewhat enlarged, is shown in vertical section, parts of it being shown in elevation.

The purpose of our invention is to provide means to attract the attention of the fish, means to prevent the twisting of the line, means to prevent the bait from becoming "snagged" in rushes or weeds, means to aid in clearing the bait of obstructions should it become clogged, and means to securely attach hooks to the bait in such manner that they cannot become entangled with the spinners. There are also other advantageous features, which will appear from the following description.

A is a swivel, which may be the same as those usually used.

B is a rod or wire which extends longitudinally through the bait, provided with a ring at its lower end, with which engages one set of hooks C.

The body of the bait proper is divided into two sections—the upper section (seen at D) and the lower, (seen at E.) Both of these parts are or may be made of wood or other equivalent material. The upper portion D is loose on the rod B, so that it is adapted to a sliding movement thereon. The lower portion E is also preferably loose on the rod, but may be rigidly connected to it, if preferred.

F is one pair of spinners, and G the other pair. They are arranged with a right and left deflection, respectively, so that one spins to the right and the other to the left. It is immaterial in which direction they respectively spin; but it is preferable that they move in opposite directions, so as to avoid twisting of the line. The upper spinners F are supported upon a hub H, loosely mounted upon the rod B, so that it is adapted to rotary and also vertical movement. The lower spinners G are attached to another hub I, which is likewise loosely mounted upon the rod B and has rotary, as well as vertical, sliding movement thereon.

J is a cap resembling an inverted saucer or small dish, which may be rigidly connected with the hub I or have independent rotary movement relative to it, as preferred. To its under side sets of hooks K K (as many as desired) are connected by rings L or otherwise, as preferred, in such manner that the edge of the cap J engaging with the shanks of the hooks will prevent them from flying outwardly and upwardly far enough to become entangled with the spinners G.

M is a washer interposed between the hubs H and I to secure desired separation to permit proper action.

From this construction various advantages follow. If the cap be attached to the hub to which the spinners G are likewise attached, then the rotation of the spinners causes rotation of the cap, and consequently of the hooks, the centrifugal action causing them to be extended laterally in a manner very desirable for hooking fish. Also the whirl of the spinners keeps all water-grasses, reeds, or floating material away from these hooks, so they are not apt to become fouled or entangled in them. Also the two pairs or sets of spinners, particularly since they revolve in opposite directions, cause considerable lateral movement of the water adjacent to the bait, so that in practice it is less liable to become clogged with obstructive matter than any other bait known to us.

The special advantage to which we particularly call attention is the fact that all of the parts are movable relative to the rod or shaft B, so that if obstructive matter, such as grass or the like, does by accident get fouled with the bait it is an easy matter to free it from the same by separating the parts by longitudinal sliding movement, so that the obstruction is readily removed.

One of the peculiar advantages secured by our invention is the reverse movement of the spinners. Although they are mounted loosely upon the rod B, nevertheless it is found in practice that where the spinners (one or more pair) revolve in one direction only they are apt to twist the line, which is objectionable both for reeling and when casting. Under our construction, in which the spinners revolve in opposite directions, this difficulty is impossible. We wish it to be understood, however, that we do not limit ourselves to the employment of two sets of spinners revolving in different directions, because several of the improvements in our invention will be present if a single set or pair of spinners only be employed. It is sometimes desirable when a single set of spinners only is used to be able to reverse their direction of rotation in order that twist may be taken out of the line. We therefore sometimes make the arms quite thin or narrow which connect the blades of the spinners to the hubs, so the angle of the blades may be changed by giving them a twist of substantially a quarter-rotation, so that the direction of their whirling may be reversed. Indeed, we do not limit ourselves to any of the special details shown and described, because it will be obvious to those who are familiar with this art that modifications may be made in such details without departing from the essentials of the invention.

Having described our invention, we claim—

1. In a bait the combination of a bait-body and a set of spinners located adjacent to the body and adapted to longitudinal separation therefrom, for the purposes set forth.

2. In a bait the combination of a bait-body, a set of spinners adjacent to the body, sets of swinging hooks arranged by the side of the body and adjacent to the spinners, and means to prevent the hooks from fouling with the spinners, for the purposes set forth.

3. In a bait the combination of a bait-body, a set of spinners adjacent to the bait-body, and hooks attached to a support which is rotated by the spinners, for the purposes set forth.

4. In a bait the combination of a body part made in two sections, and two sets of spinners located between the sections of the body part, for the purposes set forth.

5. In a bait the combination of a body part made in two sections, two sets of spinners located between the sections, and a rod extending through both sections of the body part and the hubs of the spinners, upon which they are all mounted, one section of the body part and both of the spinners being longitudinally movable upon the rod, whereby the parts may be separated for cleansing, for the purposes set forth.

6. In a bait the combination of a body part made in two sections, two sets of spinners located between the sections, the spinners being independently mounted so that they may revolve in different directions, and means whereby one section of the body part and both of the spinners may be longitudinally separated for the purpose of cleaning, for the purposes set forth.

7. In a bait the combination of two sets of spinners independently mounted and revolving in different directions, swinging hooks supported adjacent to one of the sets of spinners, and means to prevent said hooks from fouling with said spinners, for the purposes set forth.

8. In a bait the combination of a two-part bait-body mounted upon a longitudinal rod, one part at least being movable thereon, two sets of spinners independently mounted upon said rod and adapted to revolve in different directions, a cap adjacent to the lower spinners, hooks supported from said cap, and means on the cap to prevent the fouling of the hooks with the spinners, for the purposes set forth.

Signed at Kalamazoo, in the county of Kalamazoo and State of Michigan, this 27th day of June, A. D. 1900.

WILLIAM SHAKESPEARE, JR.
WILLIAM LOCHER.

Witnesses:
WALLACE F. W. STAFFORD,
ANDREW J. SHAKESPEARE, Jr.